(12) United States Patent
Thakur et al.

(10) Patent No.: US 7,797,291 B1
(45) Date of Patent: Sep. 14, 2010

(54) DATA RETENTION AUDITING

(75) Inventors: Brajendra Singh Thakur, Overland Park, KS (US); Nasir Mahmood Mirza, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 603 days.

(21) Appl. No.: 11/178,691

(22) Filed: Jul. 11, 2005

(51) Int. Cl.
*G06F 17/30* (2006.01)
(52) U.S. Cl. .................. 707/703; 707/803
(58) Field of Classification Search ............ 707/1, 707/101, 102, 103 X, 103 Y, 103 Z; 703/22; 714/38; 717/108, 116, 120, 121
See application file for complete search history.

(56) References Cited

U.S. PATENT DOCUMENTS 6,502,088 B1 * 12/2002 Gajda et al. ................. 707/2
7,269,612 B2 * 9/2007 Devarakonda et al. ...... 707/205
2003/0126139 A1 * 7/2003 Lee et al. .................... 707/100
2003/0172145 A1 * 9/2003 Nguyen ...................... 709/223
2004/0221287 A1 * 11/2004 Walmsley ................... 718/100
2006/0085374 A1 * 4/2006 Mayes et al. ................ 707/1
2007/0150387 A1 * 6/2007 Seubert et al. .............. 705/31
2007/0180490 A1 * 8/2007 Renzi et al. ................. 726/1
2008/0109448 A1 * 5/2008 Aboel-Nil et al. ........... 707/10

* cited by examiner

*Primary Examiner*—Diane Mizrahi

(57) ABSTRACT

A storage management system comprising a processing system and an interface, wherein the processing system is configured to access a first plurality of data, process the first plurality of data to determine a plurality of entities associated with the first plurality of data, determine a first constraint associated with the first plurality of data, and process the first plurality of data to determine if the first plurality of data satisfies the first constraint, and wherein the interface is configured to transmit a first action request to a first entity of the plurality of entities associated with the first plurality of data in response to determining that the first plurality of data satisfies the first constraint, and receive a first action response from the first entity indicating a first action to be performed on the first plurality of data.

16 Claims, 8 Drawing Sheets

DATA RETENTION AUDITING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to data storage solutions, and in particular, to automated data auditing for improved data storage.

2. Description of the Prior Art

Enterprises are frequently presented with the challenge of collecting and storing large amounts of data. Over time, the data accumulates and eventually becomes a liability to the organization in the form of increased storage costs.

Data auditing solutions can be implemented to reduce the costs associated with storing large amounts of data. For example, different types of data can be stored in different ways depending upon the value of the data to an enterprise. In a telecommunications example, service providers often times store accounting data for longer periods of time than system fault data.

Unfortunately, current data audit solutions do not allow enterprises to automatically audit data for data retention purposes. As a result, valuable storage resources are wasted by storing data that should be deleted or moved to a more appropriate storage resource. In addition, valuable labor hours are lost to tasks associated with manual data auditing. Furthermore, current data audit solutions create confusion and disagreement among interested parties when data is moved or deleted without notifying or consulting the interested parties.

SUMMARY OF THE INVENTION

An embodiment of the invention helps solve the above problems and other problems by providing systems, methods, and software for automatically auditing data to increase storage efficiency, reduce manual labor hours attributed to data audits, and eliminate confusion and mistakes created by manual data audits. In an embodiment of the invention, a method of operating a storage management system comprises accessing a first plurality of data, processing the first plurality of data to determine a plurality of entities associated with the first plurality of data, determining a first constraint associated with the first plurality of data, processing the first plurality of data to determine if the first plurality of data satisfies the first constraint, transmitting a first action request to a first entity of the plurality of entities associated with the first plurality of data in response to determining that the first plurality of data satisfies the first constraint, and receiving a first action response from the first entity indicating a first action to be performed on the first plurality of data.

An embodiment of the invention includes performing the first action on the first plurality of data.

In an embodiment of the invention, processing the first plurality of data to determine if the first plurality of data satisfies the first constraint comprises determining if the lifespan of the first plurality of data exceeds an allowable lifespan.

An embodiment of the invention includes transmitting a second action request to a second entity of the plurality of entities associated with the first plurality of data in response to determining that the first plurality of data satisfies the first constraint, and receiving a second action response from the second entity indicating a second action to be performed on the first plurality of data.

An embodiment of the invention includes performing the first action on the first plurality of data if the first action is the same as the second action.

An embodiment of the invention includes transmitting a first conflict message to the first entity and a second conflict message to the second entity indicating that the first action and the second action are in conflict.

An embodiment of the invention includes receiving an override message indicating a third action from either the first entity of the second entity in response to either the first conflict message or the second conflict message, and performing the third action on the first plurality of data.

In an embodiment of the invention, the first action comprises deleting the plurality of data.

BRIEF DESCRIPTION OF THE DRAWINGS

The same reference number represents the same element on all drawings.

DETAILED DESCRIPTION OF THE PREFERRED EMBODIMENT

FIGS. 1-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
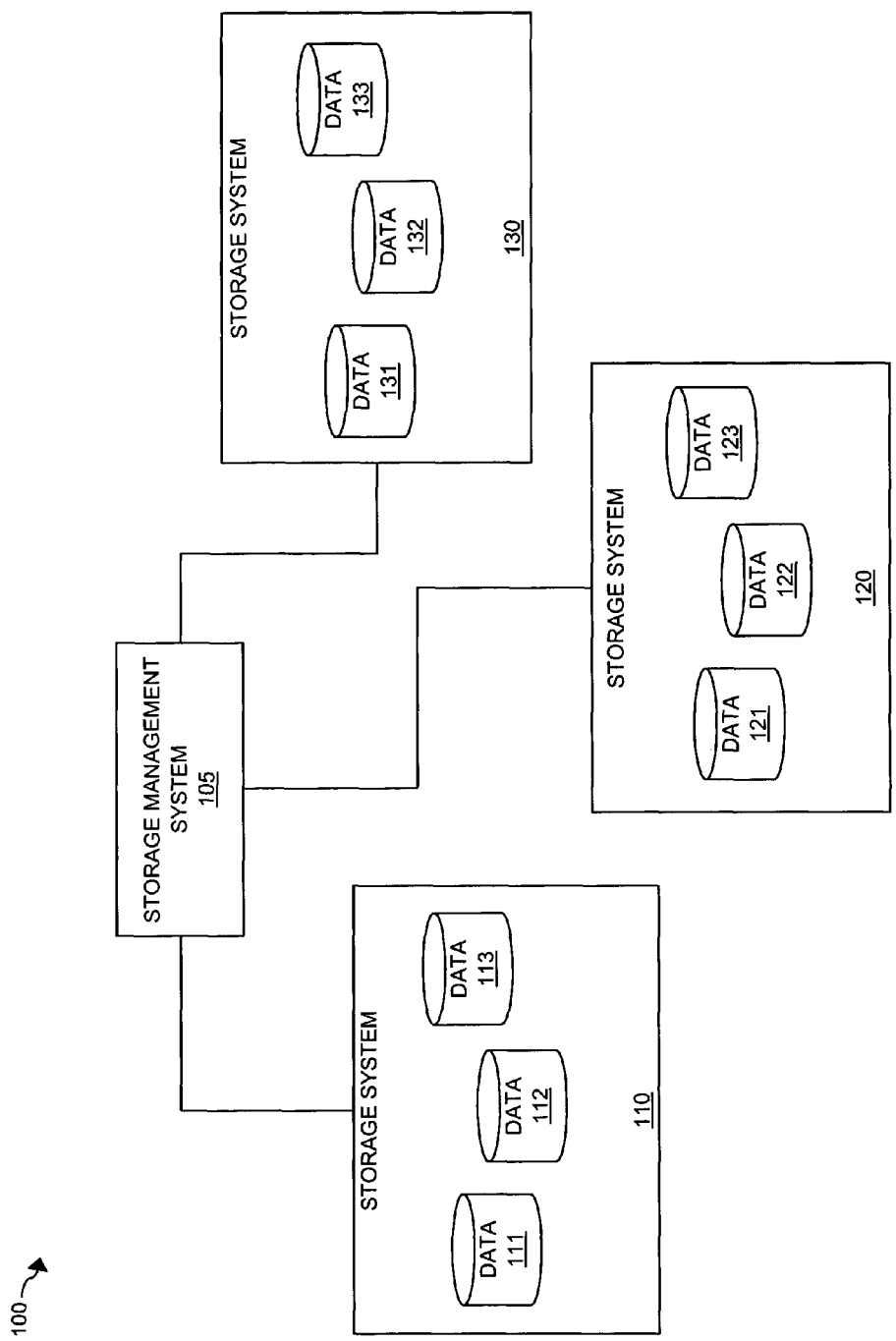
FIG. 1 illustrates a storage network in an embodiment of the invention.
Figure 2:
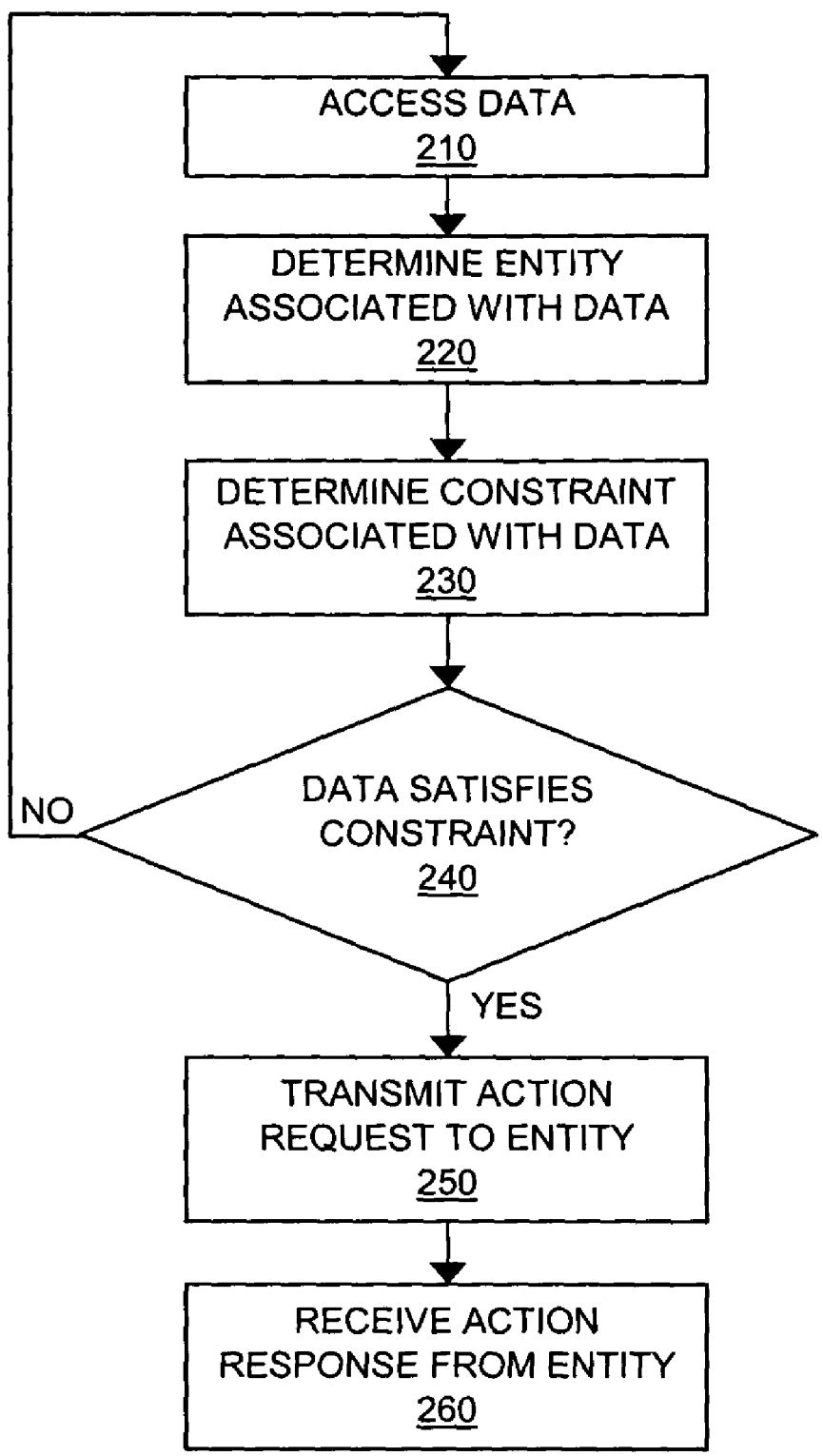
FIG. 2 illustrates the operation of a storage network in an embodiment of the invention.

FIGS. 1 and 2

FIG. 1 illustrates storage network 100 in an embodiment of the invention. Storage network 100 includes storage management system (SMS) 105, and storage systems 110, 120, and 130. SMS 105 is operatively in communication with each storage system 110, 120, and 130. Each storage system 110, 120, and 130 are operatively configured to store data. Storage system 110 stores data 111, 112, and 113. Storage system 120 stores data 121, 122, and 123. Storage system 130 stores data 131, 132, and 133.

Storage systems 110, 120, and 130 are configured to store data in databases. Databases are typically understood to be collections of formally structured data. For example, a database could be a collection of records, each record containing data. In another example, a database could be a collection of files. Each file could contain data. In another example, each file could itself contain records, each record containing data. Any number of formal structures are possible. A single database could be stored across multiple storage systems. Alternatively, multiple databases could be stored by a single storage system. In some cases, data could be stored in files or as records, as well as in other ways.

As data accumulates across storage network 100, an automated data audit process, as illustrated in FIG. 2, is performed to efficiently manage the finite amounts of storage space available in storage network 100. To begin, SMS 105 accesses data anywhere in storage network 100 (Step 210). For illustrative purposes, it is assumed that SMS 105 has accessed data 111 residing on storage system 110. Data 111 could be an individual piece of data. Similarly, data 111 could be a record, a file, a complete database, or a web page, as well as other forms of data.

Next, SMS 105 determines an entity associated with data 111. An entity could be, for example, an enterprise, an individual within an enterprise, a group of users, or a customer, as well as other entities. More than one entity could be associated with the data. For instance, an operations group within an entity could be associated with the data, as well as an administrative group. After determining an entity, SMS 105 determines a constraint associated with the data (Step 230). For example, a constraint could be the allowed lifespan of the data.

SMS 105 processes the data with the constraint to determine if the data satisfies the constraint (Step 240). For instance, the data could be a set of information and a characteristic of the set of information. The characteristic could be in the form of meta data, for example. One example of a characteristic could be the age of the set of information. If the age of the data exceeds the allowable lifespan of the data, the data is considered to satisfy the constraint. In another example, the constraint could relate to the type of the data. For instance, some types of data, such as operations data, could be subject to action, while other types of data, such as billing data, could be retained.

If the data satisfies the constraint, SMS 105 transmits an action request to the earlier determined entity (Step 250). An action response is received from the entity in response to the action request (Step 260). Lastly, SMS 105 performs the action indicated in the action response. If an action response is not received, a default action is taken by SMS 105. An example of an action is to delete the data or move the data, as well as other actions.

In an embodiment, SMS 105 determines two entities associated with the data. Upon determining the two entities, SMS 105 transmits action requests to both entities. Each entity receives the action requests and processes the requests to determine an appropriate action to be taken with respect to the data. Each entity then returns an action response to SMS 105 indicating the determined actions. The indicated actions could conflict with one another. For example, one action could request deletion of the data, while the other action could request moving the data. In this case, an appeal process is initiated whereby each entity is notified of the conflict. Upon negotiating the conflict, a new action can be agreed upon and executed by SMS 105.

In another embodiment, more than one constraint is applied to the data. For instance, the age and type of the data could be considered when SMS 105 determines to notify the associated entities. In another embodiment, different constraints could be associated with different entities. For example, data could be associated with two entities. A first constraint developed by a first of the two entities could be applied to the data, while a second constraint developed by the second of the two entities could also be applied to the data. If the data does not satisfy the first constraint, the first entity would not be sent an action request. However, if the data satisfies the second constraint, the second entity would still be sent an action request.

Advantageously, storage network 100 provides an automated data audit solution that efficiently allocates storage resources across the network. In addition, confusion and disagreement among interested entities is avoided by notifying and requesting proposed actions from the entities. When entities conflict in regard to their proposed actions, a negotiation process can resolve the conflict.

Second Embodiment Configuration and Operation

FIGS. 3-7

Figure 3:
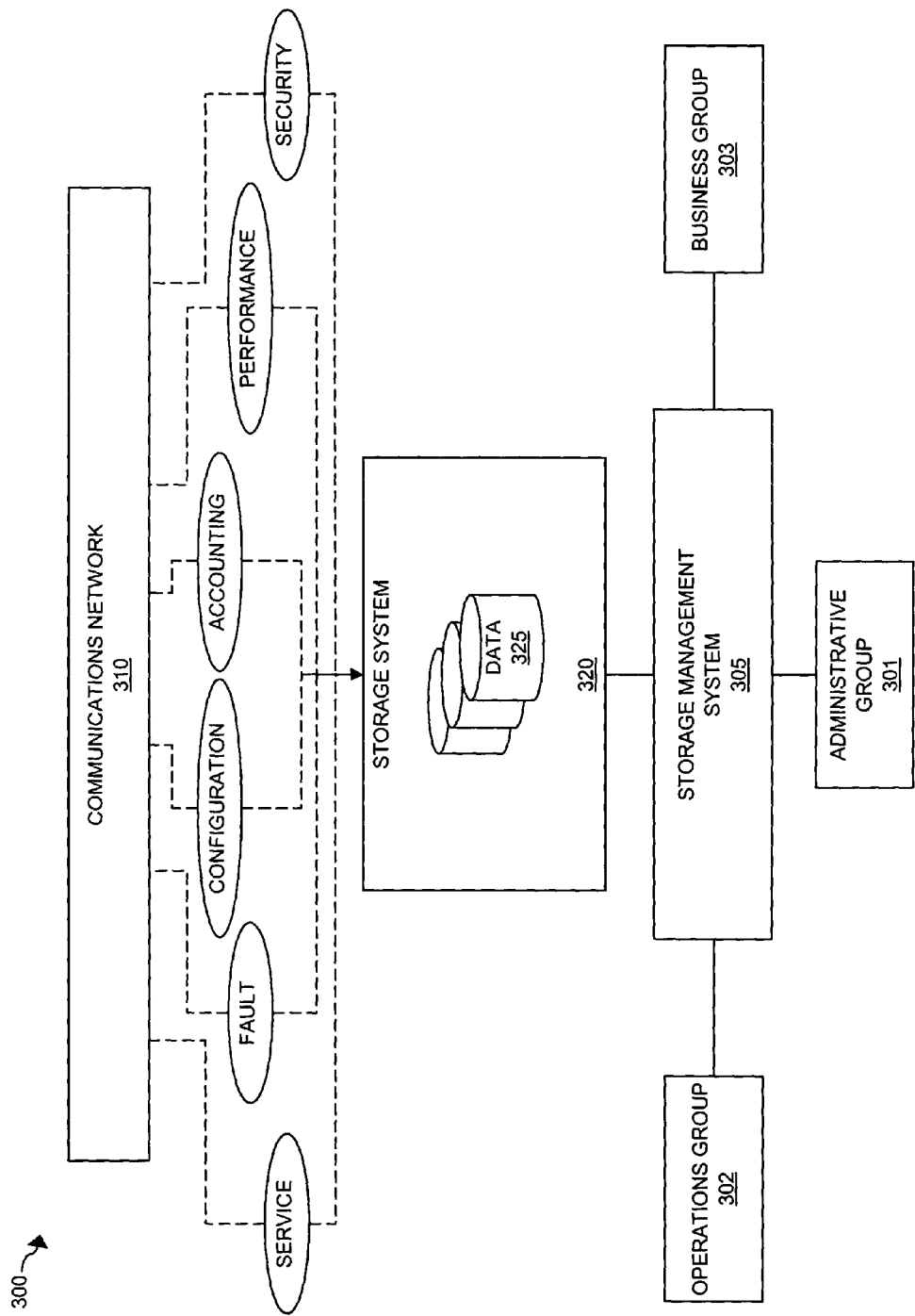
FIG. 3 illustrates a storage network in an embodiment of the invention.

FIG. 3 illustrates storage network 300 in an embodiment of the invention. Storage network 300 includes communication network 310 in communication with storage system 320. Communication network 310 could be, for example, any network that provides communications services, such as voice calls, video service, and data service, as well as other services. In operation, large amounts of data are generated by communications network 310. The data could be, for example, service, fault, configuration, accounting, performance, and security data. The data is stored in various storage systems, such as storage system 320. Data 325 represents the data stored in storage system 320.

Communication network 310 could be operated by a service provider, such as a telecommunications carrier. In such a case, the service provider includes many entities, such as operations group 302, business group 303, and administrative group 301. The various data generated by communication network 310 and stored in storage system 320 could be associated with the various entities of the service provider. For example, operations group 302 could have a particular interest in fault, configuration, performance, and security data. Similarly, business group 303 could have a particular interest in service and accounting data. Administrative group 301 could be responsible for administering storage system 320.

Figure 4:
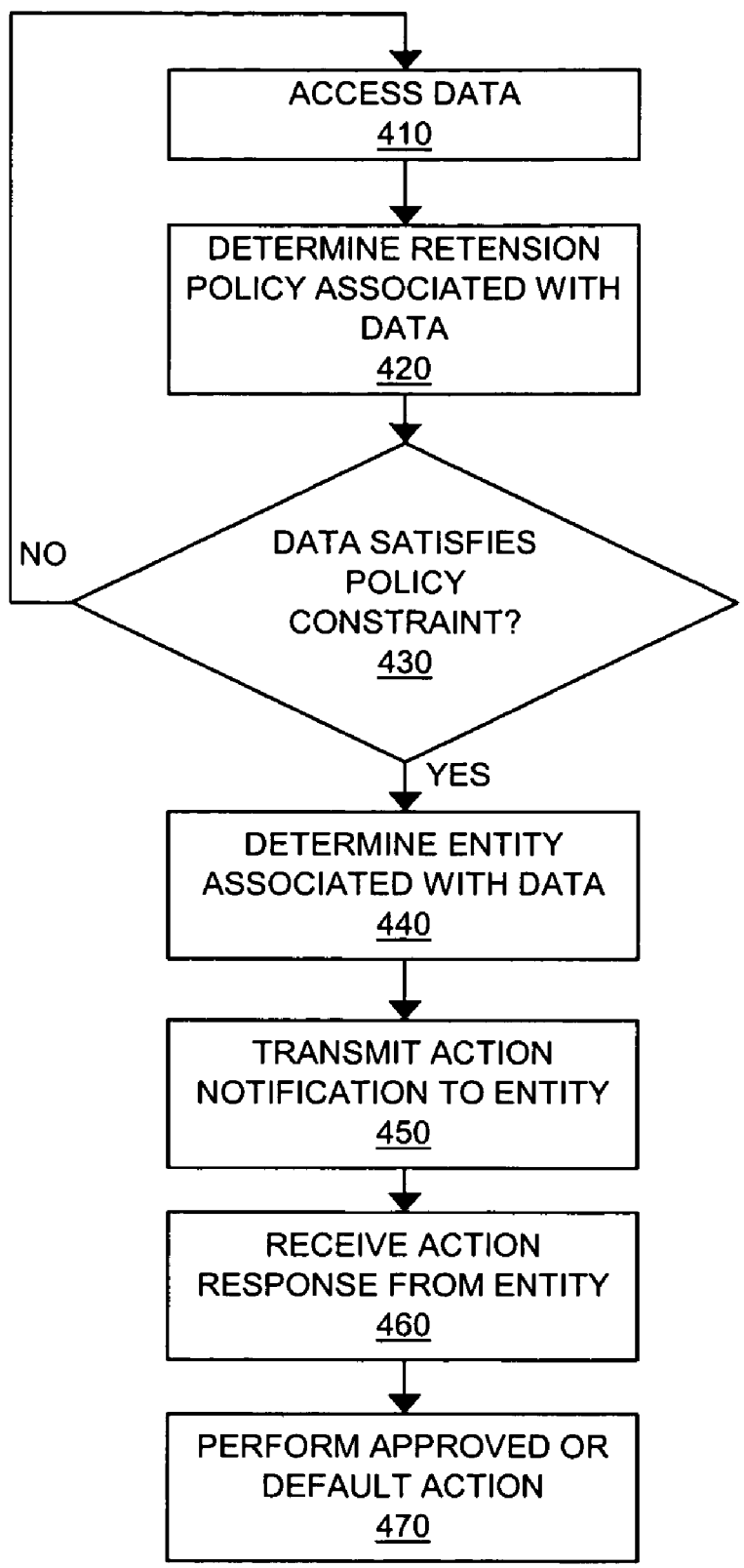
FIG. 4 illustrates the operation of a storage network in an embodiment of the invention.

FIG. 4 illustrates the operation of storage network 300 in a telecommunications example. To begin, an audit process is initiated by SMS 305 by accessing data 325 (Step 410). A set of data is processed to determine a retention policy associated with data 325 (Step 420). The retention policy could be based on at least one of several factors, including a priority of the data and the type of the data, as well as other factors. The retention policy could include a constraint against which the data is tested (Step 430). If the data satisfies the constraint, the process returns to Step 410 whereby the next set of data is accessed and processed.

If the data satisfies the constraint, SMS 305 determines an entity associated with the data (Step 440). Determining an entity could be accomplished by performing a table look-up to a table that holds the identities of particular entities in relation to different data. For instance, the table could identify business group 303 as having a relationship to call records. Thus, call records are encountered during an audit process, business group 303 is determined to be an associated entity. Similarly, the table could identify operations group 302 as related to fault and performance data. When fault or performance data is encountered during an audit process, operations group 302 is determined to be an associated entity. Any number of different relationships between entities and data are possible.

Upon determining an entity associated with the data, an action notification is transmitted to the entity (Step 450). The entity receives the action notification and returns an action response to SMS 305. SMS 305 receives the action response (Step 460) and performs the action indicated in the action response (Step 470). If no action response is sent, or if the action response does not indicate an action, a default action is taken by SMS 305 with respect to the subject data.

In some cases, more than one entity is associated with the data. In these cases, SMS 305 generates and transmits action notifications to each entity. The action notification identifies the data, and indicates that the data satisfies the policy constraint. In some cases, the respective action responses returned by the multiple entities could conflict. For instance, one entity could return a delete instruction for the data, whereas another entity could return a move instruction for the data. In this case, SMS 305 could transmit an appeal notification to each entity indicating the other entities involved in the conflict and the respective instructions returned by the entities.

Each entity would then return an appeal response indicating whether or not each entity objects to the proposed instructions of the other entities. For example, the entity requesting deletion of the data would return an appeal response indicating that it does not object to moving the data rather than deleting the data. The entity requesting moving the data would return an appeal response indicating that it objects to deleting the data. SMS 305 would receive the appeal responses and process the appeal responses to resolve the appeal responses with the initial action responses. In this case, the data would be moved rather than deleted.

Figure 5:
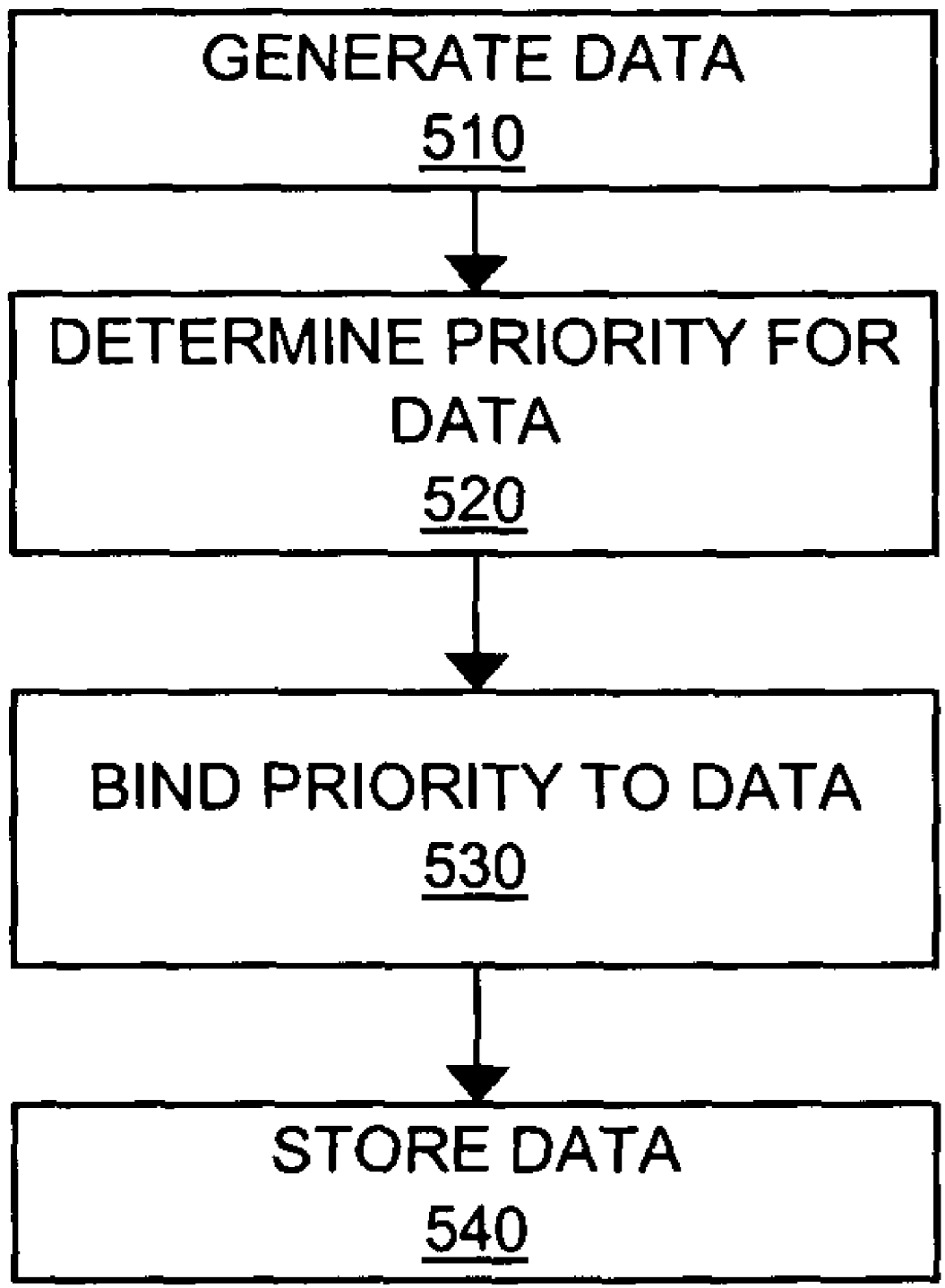
FIG. 5 illustrates the operation of a storage network in an embodiment of the invention.

FIG. 5 illustrates a priority binding process applied to data 325. To begin, data is generated by communication network 310 (Step 510). Next, a priority is determined for the data (Step 520). Depending upon the application generating the data, the priority could be determined at run-time as well as at a later time. Additionally, the priority could be determined by the generating application running in communication network 310. Alternative, the priority could be determined by SMS 305 as the data is transferred to storage system 320 for storage. In another alternative, the priority could be determined during an audit process by SMS 305.

Upon determining the priority, a bind step is executed to bind the priority to the data (Step 530). The priority could be bound to the data as meta data. For instance, if the data is a call record, an additional priority field could be added to the call record and populated with the priority of the call record. If the data is a file, a priority indicator could be written to the file. Other examples of priority data are possible. Upon binding the priority to the data, the data is stored in storage system 320 (Step 540).

Figure 6:
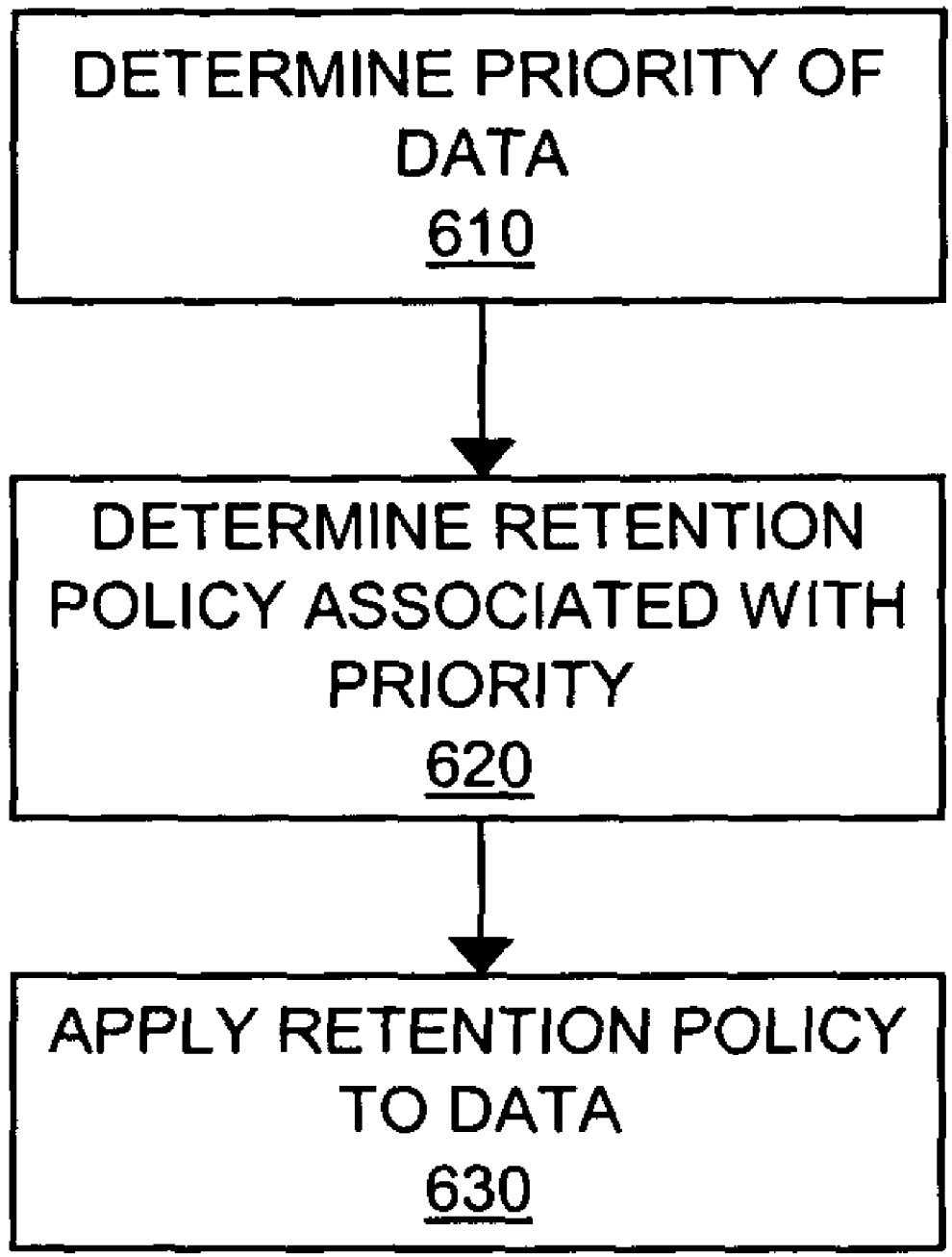
FIG. 6 illustrates the operation of a storage network in an embodiment of the invention.

FIG. 6 illustrates a retention policy determination process whereby a retention policy is determined based on the priority of data. The process illustrated in FIG. 6 could be executed at Step 420 of FIG. 4. To begin, the priority of a set of data is determined by SMS 305 (Step 610). The priority could be determined by, for instance, reading the priority field of a call record. Next, SMS 305 determines a retention policy associated with the priority (Step 620). For example, data having a high priority could require long-term storage, whereas data having a low priority could require short-term storage. Lastly, SMS 305 applies the retention policy to the data (Step 630). For example, if the data has a high priority and is still younger than its long-term storage requirement, the data would be retained. If the data has a high priority but is older than its long-term storage requirement, the data would be processed for deletion.

Figure 7:
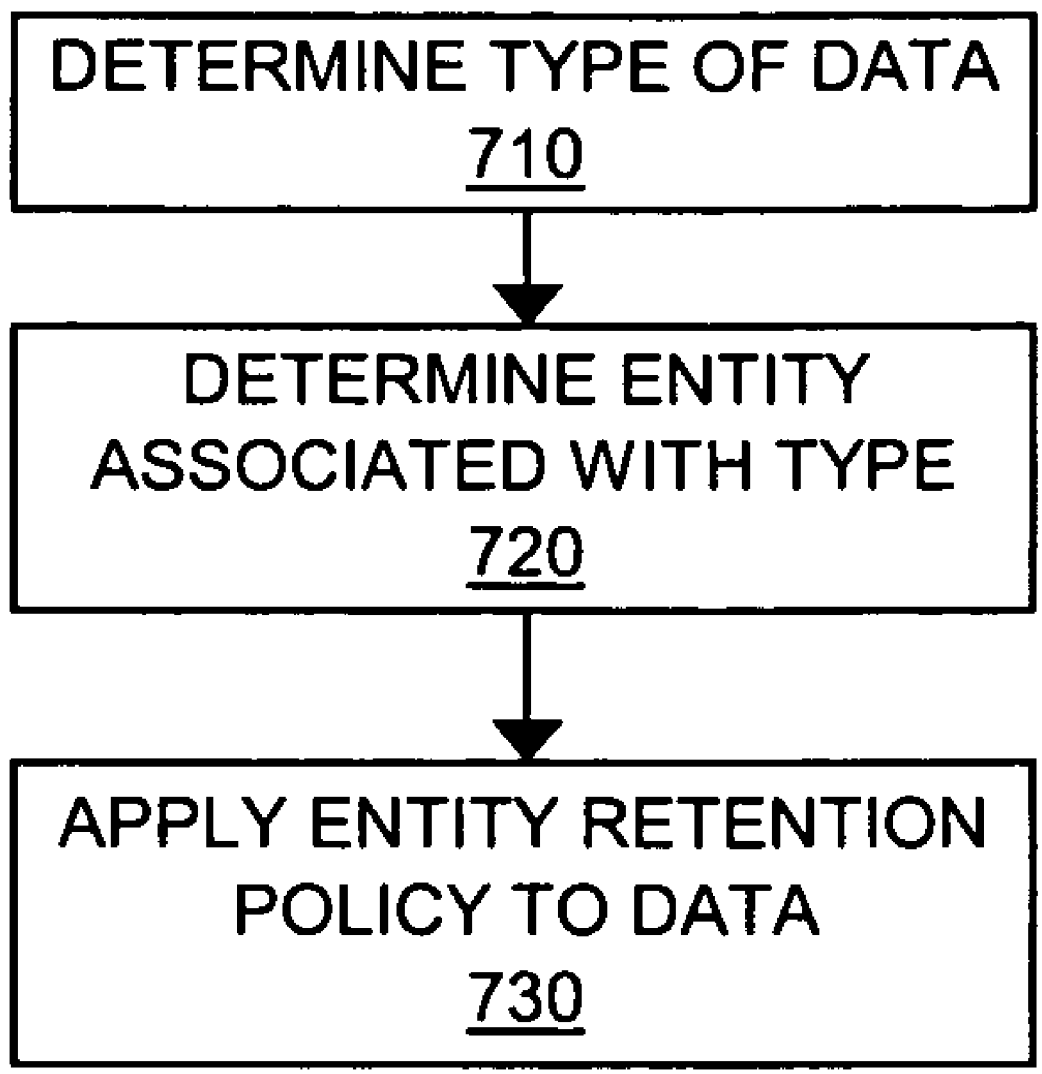
FIG. 7 illustrates the operation of a storage network in an embodiment of the invention.

FIG. 7 illustrates a retention policy determination process whereby a retention policy is determined based on the type of the data. The process illustrated in FIG. 7 could be executed at Step 420 of FIG. 4. To begin, the type of a set of data is determined by SMS 305 (Step 710). For example, configuration data could be considered data of the configuration type. Similarly, accounting data could be considered data of the accounting type. Next, SMS 305 determines a retention policy associated with the data type (Step 720). For example, configuration data could be associated with a short-term storage policy. This could mean that configuration data does not require long-term storage. Alternatively, accounting data could be associated with a long-term storage policy. Lastly, SMS 305 applies the retention policy to the data (Step 730). For instance, accounting data that is younger than its long-term storage requirement would be retained, while configuration data that is older than its short-term storage requirement would be processed for deletion.

While FIG. 3 illustrates a single storage system, storage system 320, it is possible that a storage network could include more than one storage system. In such a case, SMS 305 could be operatively configured to audit the multiple storage systems. However, it could arise that duplicate data is stored on more than one storage system. For example, service data, such as a call record, could be stored by a billing storage system and in duplicate by an operations storage system. The additional audit step of determining the type of storage system could be taken prior to determining retention policies. For example, the type of a storage system could be an operations type, or alternatively, a billing type. The type of storage system could then be associated with an entity. Furthermore, the retention policies could also be entity-specific. In this manner, the entities associated with data are discovered prior to determining the retention policy for the data. Then, the entity-specific retention policies can be applied to the data. Conflicting action results can be resolved by the various entities.

Computer System

FIG. 8

Figure 8:
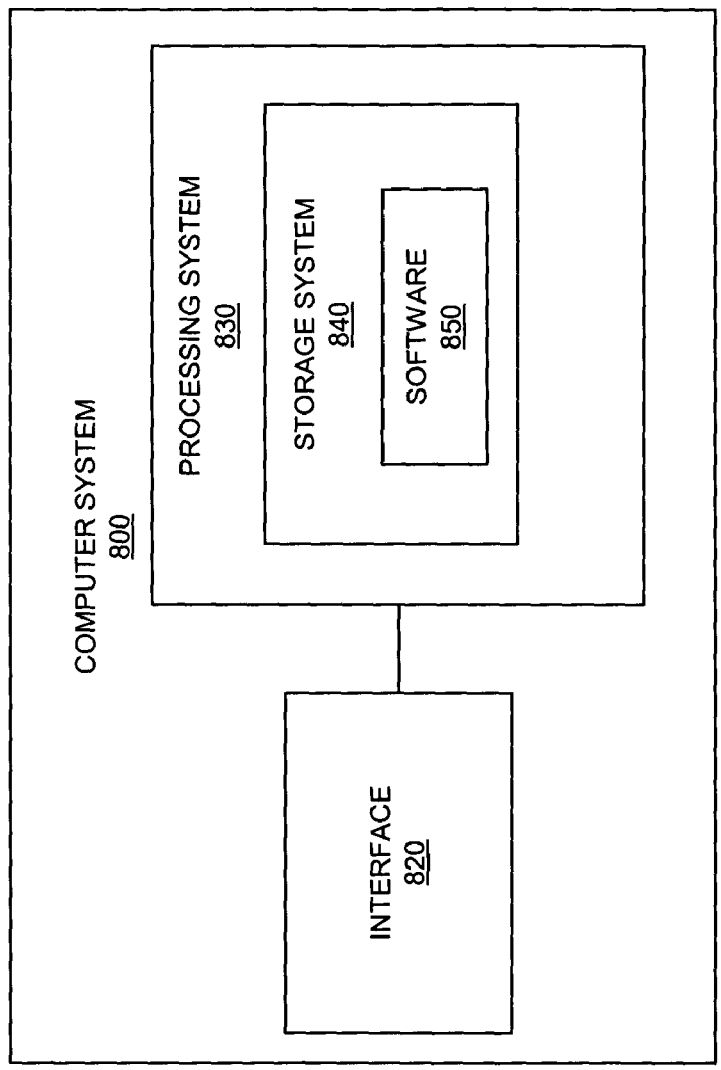
FIG. 8 illustrates a computer system in an embodiment of the invention.

FIG. 8 illustrates computer system 800 in an embodiment of the invention. Computer system 800 includes interface 820, processing system 830, storage system 840, and software 850. Storage system 840 stores software 850. Processing system 830 is linked to interface 820. Computer system 800 could be comprised of a programmed general-purpose computer, although those skilled in the art will appreciate that programmable or special purpose circuitry and equipment may be used. Computer system 800 may use a client server architecture where operations are distributed among a server system and client devices that together comprise elements 820-850.

Interface 820 could comprise a network interface card, modem, port, or some other communication device. Interface 820 may be distributed among multiple communication devices. Processing system 830 could comprise a computer microprocessor, logic circuit, or some other processing device. Processing system 830 may be distributed among multiple processing devices. Storage system 840 could comprise a disk, tape, integrated circuit, server, or some other memory device. Storage system 840 may be distributed among multiple memory devices.

Processing system 830 retrieves and executes software 850 from storage system 840. Software 850 may comprise an operating system, utilities, drivers, networking software, and other software typically loaded onto a general-purpose computer. Software 850 could also comprise an application program, firmware, or some other form of machine-readable processing instructions. When executed by the processing system 830, software 850 directs processing system 830 to operate as described for storage management systems 105 and 305.

What is claimed is:

1. A method of operating a storage management system including a processing system, and an interface, the method comprising:
    through the interface, accessing a first plurality of data;
    in the processing system, processing the first plurality of data to determine a plurality of entities associated with the first plurality of data, wherein each of the plurality of entities comprises a one of an enterprise, an individual within the enterprise, or a group of users;
    in the processing system, determining a first constraint associated with the first plurality of data;
    in the processing system, processing the first plurality of data to determine when the first plurality of data satisfies the first constraint;
    through the interface, transmitting a first action request to a first entity of the plurality of entities associated with the first plurality of data in response to determining that the first plurality of data satisfies the first constraint; and
    through the interface, receiving a first action response from the first entity indicating a first action to be performed on the first plurality of data.

2. The method of claim 1 further comprising performing the first action on the first plurality of data.

3. The method of claim 1 wherein processing the first plurality of data to determine if the first plurality of data satisfies the first constraint comprises determining if the lifespan of the first plurality of data exceeds an allowable lifespan.

4. The method of claim 1 further comprising transmitting a second action request to a second entity of the plurality of entities associated with the first plurality of data in response to determining that the first plurality of data satisfies the first constraint, and receiving a second action response from the second entity indicating a second action to be performed on the first plurality of data.

5. The method of claim 4 further comprising performing the first action on the first plurality of data if the first action is the same as the second action.

6. The method of claim 4 further comprising transmitting a first conflict message to the first entity and a second conflict message to the second entity indicating that the first action and the second action are in conflict.

7. The method of claim 6 further comprising receiving an override message indicating a third action from either the first entity of the second entity in response to either the first conflict message or the second conflict message, and performing the third action on the first plurality of data.

8. The method of claim 1 wherein the first action comprises deleting the plurality of data.

9. A storage management system comprising:
    a processing system configured to access a first plurality of data, process the first plurality of data to determine a plurality of entities associated with the first plurality of data, determine a first constraint associated with the first plurality of data, and process the first plurality of data to determine when the first plurality of data satisfies the first constraint, wherein each of the plurality of entities comprises a one of an enterprise, an individual within the enterprise, or a group of users; and
    an interface coupled to the processing system configured to transmit a first action request to a first entity of the plurality of entities associated with the first plurality of data in response to determining that the first plurality of data satisfies the first constraint, and receive a first action response from the first entity indicating a first action to be performed on the first plurality of data.

10. The storage management system of claim 9 further comprising performing the first action on the first plurality of data.

11. The storage management system of claim 9 wherein processing the first plurality of data to determine if the first plurality of data satisfies the first constraint comprises determining if the lifespan of the first plurality of data exceeds an allowable lifespan.

12. The storage management system of claim 9 further comprising transmitting a second action request to a second entity of the plurality of entities associated with the first plurality of data in response to determining that the first plurality of data satisfies the first constraint, and receiving a second action response from the second entity indicating a second action to be performed on the first plurality of data.

13. The storage management system of claim 12 further comprising performing the first action on the first plurality of data if the first action is the same as the second action.

14. The storage management system of claim 12 further comprising transmitting a first conflict message to the first entity and a second conflict message to the second entity indicating that the first action and the second action are in conflict.

15. The storage management system of claim 14 further comprising receiving an override message indicating a third action from either the first entity of the second entity in response to either the first conflict message or the second conflict message, and performing the third action on the first plurality of data.

16. The storage management system of claim 9 wherein the first action comprises deleting the plurality of data.

* * * * *